US010437754B1

(12) United States Patent
Ebisuzaki et al.

(10) Patent No.: US 10,437,754 B1
(45) Date of Patent: Oct. 8, 2019

(54) DIAGNOSTIC FAULT MANAGEMENT CONTROLLER FOR DISTRIBUTED COMPUTING

(71) Applicant: Amazon Technologies, Inc., Seattle, WA (US)

(72) Inventors: Gavin Akira Ebisuzaki, Issaquah, WA (US); Vijay Patel, Olympia, WA (US); Christopher James BeSerra, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 15/274,524

(22) Filed: Sep. 23, 2016

(51) Int. Cl.
*G06F 13/24* (2006.01)
*G06F 13/16* (2006.01)
*G06T 1/60* (2006.01)

(52) U.S. Cl.
CPC .......... *G06F 13/24* (2013.01); *G06F 13/1668* (2013.01); *G06T 1/60* (2013.01); *G06T 2200/28* (2013.01)

(58) Field of Classification Search
CPC ...................................................... G06F 13/24
See application file for complete search history.

(56) References Cited

U.S. PATENT DOCUMENTS

| | | | | |
|---|---|---|---|---|
| 6,460,070 B1* | 10/2002 | Turek | ................. | G06F 11/0709 709/202 |
| 9,274,902 B1* | 3/2016 | Morley | ............... | G06F 11/2002 |
| 9,495,234 B1* | 11/2016 | Hamman | ............. | G06F 11/079 |
| 9,990,244 B2* | 6/2018 | Lesartre | ............... | G06F 11/0793 |
| 2008/0109683 A1* | 5/2008 | Erwin | ................. | G06F 11/0709 714/46 |
| 2015/0381931 A1* | 12/2015 | Uhma | ................... | H04N 7/147 348/14.03 |

* cited by examiner

*Primary Examiner* — Tammara R Peyton
(74) *Attorney, Agent, or Firm* — BakerHostetler

(57) ABSTRACT

A management controller may request units of diagnostic information from a BIOS of the management controller's host computing device. The management controller may trigger an interrupt, in response to which the BIOS, by the execution of a processor of the host, may cause the diagnostic information to be copied to a video memory of the management controller. Upon the completion of the interrupt handler, a graphics controller of the management controller may cause the diagnostic information to be transferred to a non-volatile memory, and transferred out-of-band to a client device.

20 Claims, 8 Drawing Sheets

US 10,437,754 B1

DIAGNOSTIC FAULT MANAGEMENT CONTROLLER FOR DISTRIBUTED COMPUTING

BACKGROUND

The complexity and difficulty of maintaining data centers has grown in proportion to the number of computing nodes maintained at each site. Issues faced by those who administer data centers have include the collection of diagnostic information from computing nodes that have failed and the use of that information to identify and correct hardware and software issues.

A management controller is a device used to facilitate the exchange of diagnostic information. Typically, a management controller is embedded in the motherboard of a server computing device, and permits client devices to interact with and obtain data, through the management controller, that pertains to the operation of the server. Although a management controller may be embedded on the motherboard of a computing device, the management controller is typically isolated from its host computing device and may continue to operate even when the host encounters a fault. However, the interfaces between the management controller and the host may operate at relatively low speeds.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
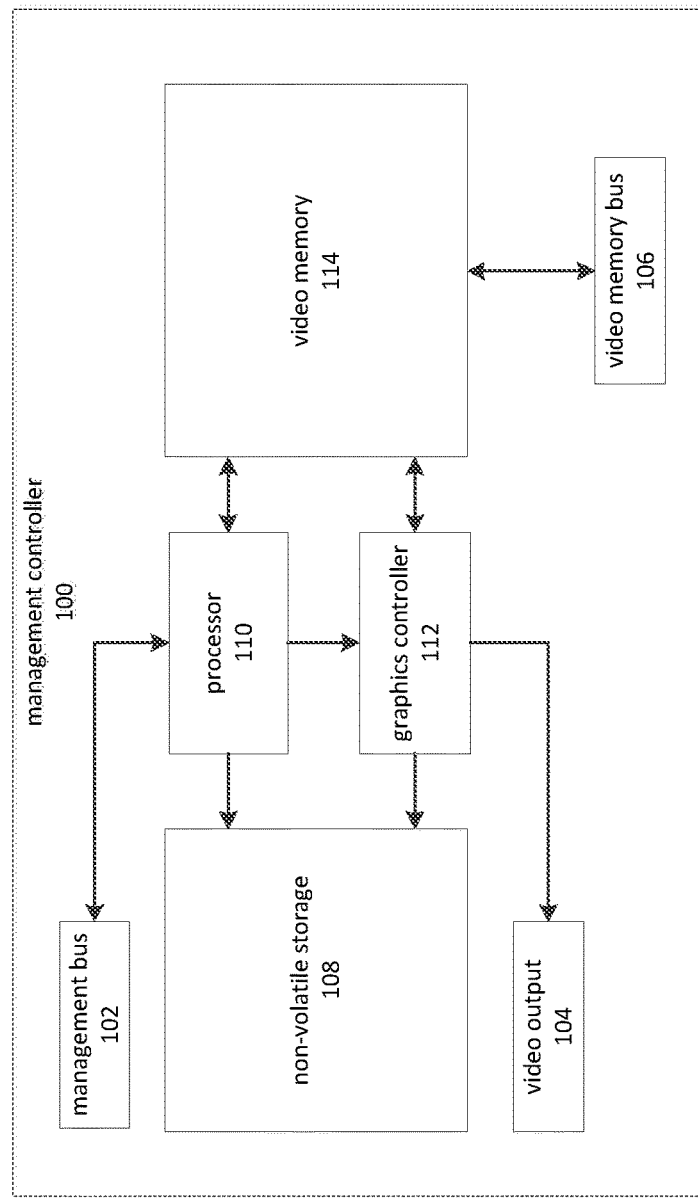
FIG. 1 is a block diagram depicting a management controller.

Disclosed herein are systems, methods, and computer program products pertaining to the management of a computing device, and in particular to the collection of diagnostic data from a computing device. In an example, a management controller may comprise a first one or more processors, a graphics controller, and video memory addressable by the graphics controller. The video memory may be connected to a second one or more processors external to the management controller. For example, the management controller may be embedded on the motherboard of a computing device. The embedded management controller's video memory may be linked to other components on the motherboard, such as a central processing unit ("CPU"), memory controller, or graphics controller, via a first communications bus.

The management controller may further comprise one or more memories which have stored thereon instructions for execution by a processor of the management controller. When executed, the instructions may cause the management controller to send data indicative of a request to receive a first unit of diagnostic information from a basic input/output system ("BIOS") of the computing device. The instructions may, for example, be sent via an interrupt signal associated with parameters identifying the requested unit of diagnostic information.

The instructions, when executed, may further cause the management controller to receive at least a subset of the requested data that has been stored in the video memory. The requested data may have been placed in the video memory by a memory transfer, initiated by the computing device's BIOS, over the first communications bus. The first communications bus, over which video data is normally transmitted, may be of relatively high speed compared to the other interfaces of the management controller.

The instructions may further cause the management controller's graphics controller to transfer the subset of diagnostic information to a non-volatile memory. The non-volatile memory may permit persistent storage of the diagnostic information. The diagnostic information may then be transferred from the non-volatile memory to an administrative client, or other destination, via a second communications bus. The second communications bus may, for example, be a relatively low speed channel that enables communication between an administrative client device and the management controller.

A management controller, sometimes referred to as a baseboard management controller, server management controller, or server management processor, is a component sometimes included in a computing device to support various functions related to the management of the computing device. These functions may include collecting diagnostic data and providing remote access to various diagnostic commands and functions.

A management controller may be integrated into a computing device. In some instances, for example, the components of a management controller are embedded in the motherboard of a computing device. Despite being so included, management controllers may typically be designed to maintain a high degree of isolation from other system components. This isolation may help to ensure that the management controller remains operational even when other system components have failed, and thus may allow the management controller to be useful to diagnose or recover from system failures.

A management controller may comprise various components such as a processor, memory, and input/output support. These components may be included in a microcontroller or a system-on-a-chip ("SoC"). A management controller may also include a video controller and video memory, either as distinct components or as part of an SoC.

A management controller may interface with the computing device via various communications buses. These may include systems management bus ("SMBus"), inter-integrated circuit bus ("I2C"), low pin-count bus ("LPC"), serial communications bus, and so forth. These interfaces are generally low-speed interfaces, and thus provide relatively little bandwidth. These and other similarly low-speed, low-bandwidth communications buses may also be used to communicate between a client device and the management controller.

A management controller may, however, exchange video information with its host computing device via a relatively high speed communication bus, such as peripheral component interconnect express ("PCIe"). A management controller may typically include video memory, such as double data rate ("DDR") memory, to which the computing device may write video data. As used herein, video memory refers to memory which may be accessed by a graphics controller of the management controller and to which the host computing device has access. The data written to the video memory may be written through a PCIe bus, or some other type of communication channel that provides sufficient bandwidth for video data.

Diagnostic information may be transferred from the host computing device to the management controller by using a communications bus such as PCIe to write to the management controller's video memory. The management controller may then address, i.e. access, this data via its graphics controller.

The BIOS of the host computing device may comprise instructions that, when executed by the CPU of the host, may initiate the transfer of the diagnostic information to the video memory. A BIOS may comprise instructions for performing various input and output functions and managing communications between the various components of the host computing device. Typically, the instructions for the BIOS may be stored on firmware. The instructions of the BIOS are typically among those first executed when the host computing device is started. As used herein, a BIOS may refer to various instructions sets consistent with the foregoing description, and may include, for example, various firmware-based hardware interfaces such as the unified extensible firmware interface ("UEFI"). A BIOS may, for example, include instruction sets for interfacing between an operating system and the devices of a computing platform.

Aspects of using the video memory for the transfer of diagnostic information may be better understood in view of FIG. 1, which is a block diagram depicting a management controller. The management controller 100, as depicted by FIG. 1, may employ an interrupt mechanism to receive diagnostic information through a video-memory-based communications channel. Upon receiving the diagnostic information in the video memory, the management controller 100 may store transfer the diagnostic information to a non-volatile memory.

The management controller 100 may comprise a processor 110 and a graphics controller 112. The processor 110 may be connected to a video memory 114 and a non-volatile memory 108, such that the contents of the video memory 114 and the non-volatile memory 108 are addressable by the processor 110. Similarly, the graphics controller 112 may be connected to the video memory 114 and the non-volatile memory 108, such that the contents of the video memory 114 and the non-volatile memory 108 are addressable by the graphics controller 112. In some instances, aspects of the management controller 100 may be integrated into a single component. For example, an SoC might comprise processors 110, graphics controller 112, and video memory 114.

The processor 110 may be any of various general-purpose or special-purpose microprocessors, such as those sometimes used as CPUs or those sometimes included in various microcontrollers.

The graphics controller 112 may comprise a processor specialized for the handling of video data and graphics, or a processor specialized for similar highly parallel computations. A graphics controller, such as the depicted graphics controller 112, may sometimes be referred to as a graphics coprocessor or a graphics processing unit. The graphics controller 112 may in some cases be integrated into a CPU also comprising the processor 110. The graphics controller 112 portion of the CPU may contain specialized circuitry for performing highly parallel computations, as well as other functions related to graphics processing, similar to what is found in discrete graphics controllers.

The video memory 114 may comprise dynamic random-access memory suited for use in storing data related to video or graphics. Examples include, but are not limited to, DDR2, DDR3, and DDR 4 memory chips or memory modules. The video memory 114 may be addressable by the graphics controller 112. For example, the graphics controller 112 may read the contents of the video memory 114 in order to generate a video signal for transmission to an external display via the video output 104.

Note that in many cases, the video output 104 is used for diagnostic and management purposes, rather than as the primary video output of the host computing device. The video output 104 may also be used in some instances to view output provided directly by the management controller 100, such as a graphical user interface for interacting with the management controller 100.

The video memory 114 may be addressable by the host computing device via the video memory bus 106. For example, under certain circumstances the BIOS 206 of the host computing device may direct video output to the video memory 114, instead of or in addition to the primary video memory of the host computing system.

The management controller may provide input and output via a management bus 102. The management controller 100 may comprise buses such as the aforementioned SMBus, I2C, LPC, and serial communications buses. The management bus 102 may correspond to any one of these bus types, or other similar bus types. The depicted management bus 102 may provide output to an external source, such as a client device coupled to the management controller 100.

The video memory 114 may be used to store diagnostic information in addition to or instead of video data. The diagnostic information may be written to the video memory 114 by the execution of BIOS 206 functions by the processor(s) of the host computing device. Once loaded into video memory 114, the graphics controller 112 and/or processor 110 may transfer the diagnostic information from the video memory 114 to a second memory, such as the depicted non-volatile storage 108.

In some instances, the processor 110 of the management controller 100 may cause the graphics controller 112 to transfer diagnostic information from the video memory 114 to the non-volatile storage 108. For example, the processor 110 may cause the graphics controller to execute functions related to memory transfer. In some instances, the graphics controller 112 may execute direct memory access ("DMA") operations to transfer diagnostic information from the video memory 114 to the non-volatile storage 108. The DMA operation may be performed in response to an interrupt signal generated by the BIOS 206 and handled, via an interrupt handler, by the processor 110.

The graphics controller 112 may disable or adjust its generation of a video signal when video memory 114 is being used for diagnostic information. In some instances, the video memory 114 may be segmented into frame buffers, where each frame buffer may correspond to a frame of the video signal generated by the graphics controller 112. One or more of these frame buffers may be disabled and used to store diagnostic information. The remaining buffers may be used for video. When not used for the transfer of diagnostic information, the normal operation of the frame buffers may be restored.

In other instances, the graphics controller 112 may temporarily disable generation of the video signal. In some instances, the signal may be disabled when the video memory 114 is to be used for diagnostic information, and enabled at other times. The BIOS 206 of the host computing device may, for example, write data to the video memory 114 to permit the graphics controller 112 to determine whether the video memory 114 contains graphics data or diagnostic information. Alternatively, the BIOS 206 of the host computing device may send a signal or trigger an interrupt to cause video generation to be suspended or resumed.

Figure 2:
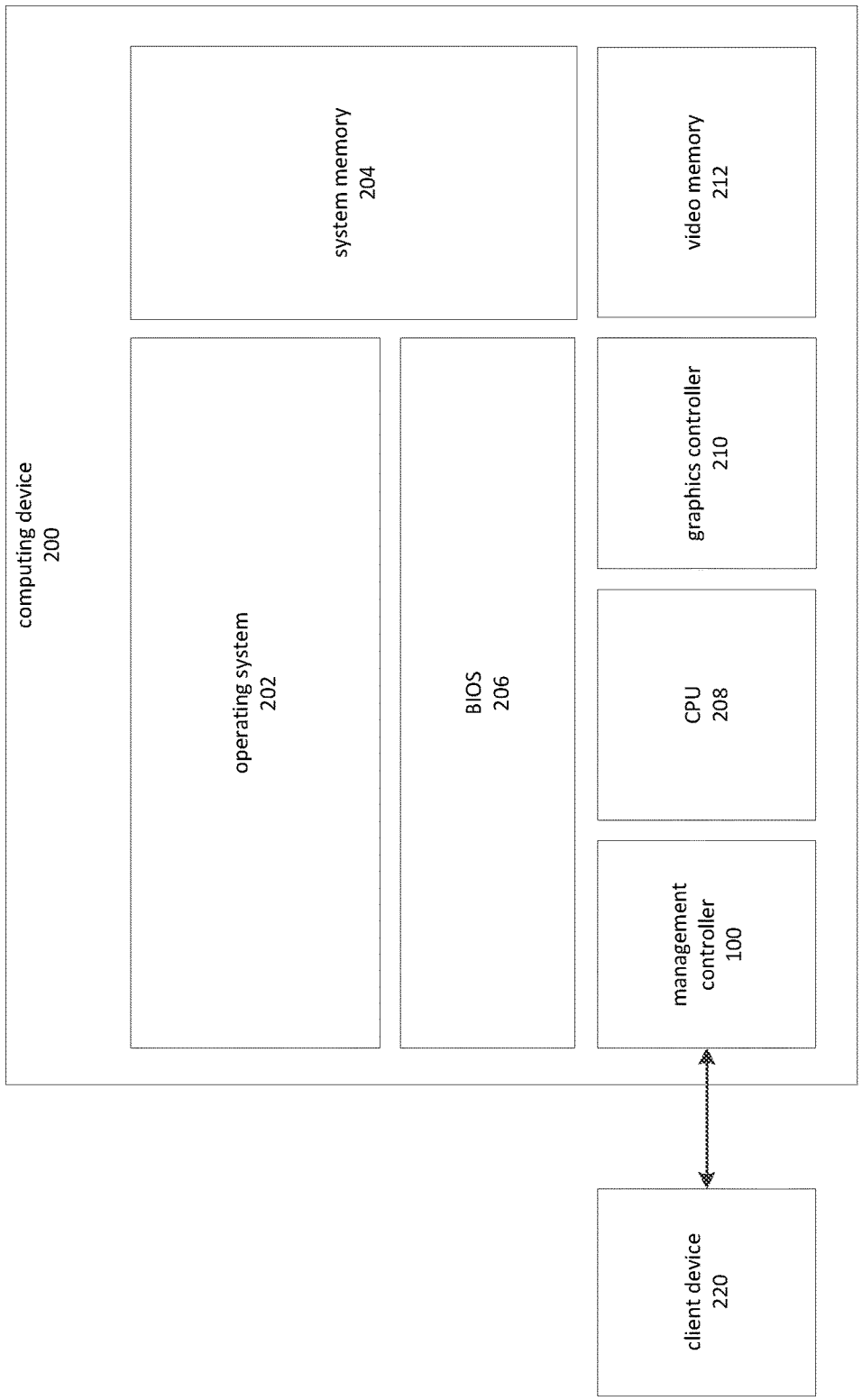
FIG. 2 is a block diagram depicting a computing system with an embedded management controller.

The operation of the BIOS 206 in relation to the management controller 100 may be further understood in view of FIG. 2, which is a block diagram depicting a computing system with a management controller.

A computing device 200 may comprise a CPU 208 and system memory 204. The computing device 200 may also comprise a graphics controller 210 and video memory 212. These may be separate from the graphics controller 112 and video memory 114 of the management controller 100.

The computing device 200 may also comprise a management controller 100. The management controller 100 may interface with a client device 220 for performing management operations. The client device 100 may, for example, be a computing device with support for a platform management interface that may enable it to request and receive information from the management controller 100, and that may enable the client device to request that the management controller 100 perform various administrative and diagnostic functions.

The computing device 200 may further comprise an operating system 202 and BIOS 206. System failures may occur as a consequence of an operating system 202 failure, BIOS 206 failure, or a hardware failure. When a failure occurs the BIOS 206 and the management controller 100 may act to preserve diagnostic information for the computing device 200 and its constituent components.

The diagnostic information may include a wide variety of data. Examples include, but are not limited to, logs of events such as thermal events or machine check exceptions, power events, unexpected shutdown events, and so forth. Diagnostic information may also include, but is not limited to, stack traces, memory dumps, processor register values, and so forth.

The diagnostic information may be collected through various means. The BIOS 206 may, for example, comprise instructions that may be executed by the CPU 208 to permit collection of the diagnostic information. The collection of diagnostic data may comprise, for example, accessing registers and memory locations, reading data such as event logs from a storage device or other memory, and so forth.

Figure 3:
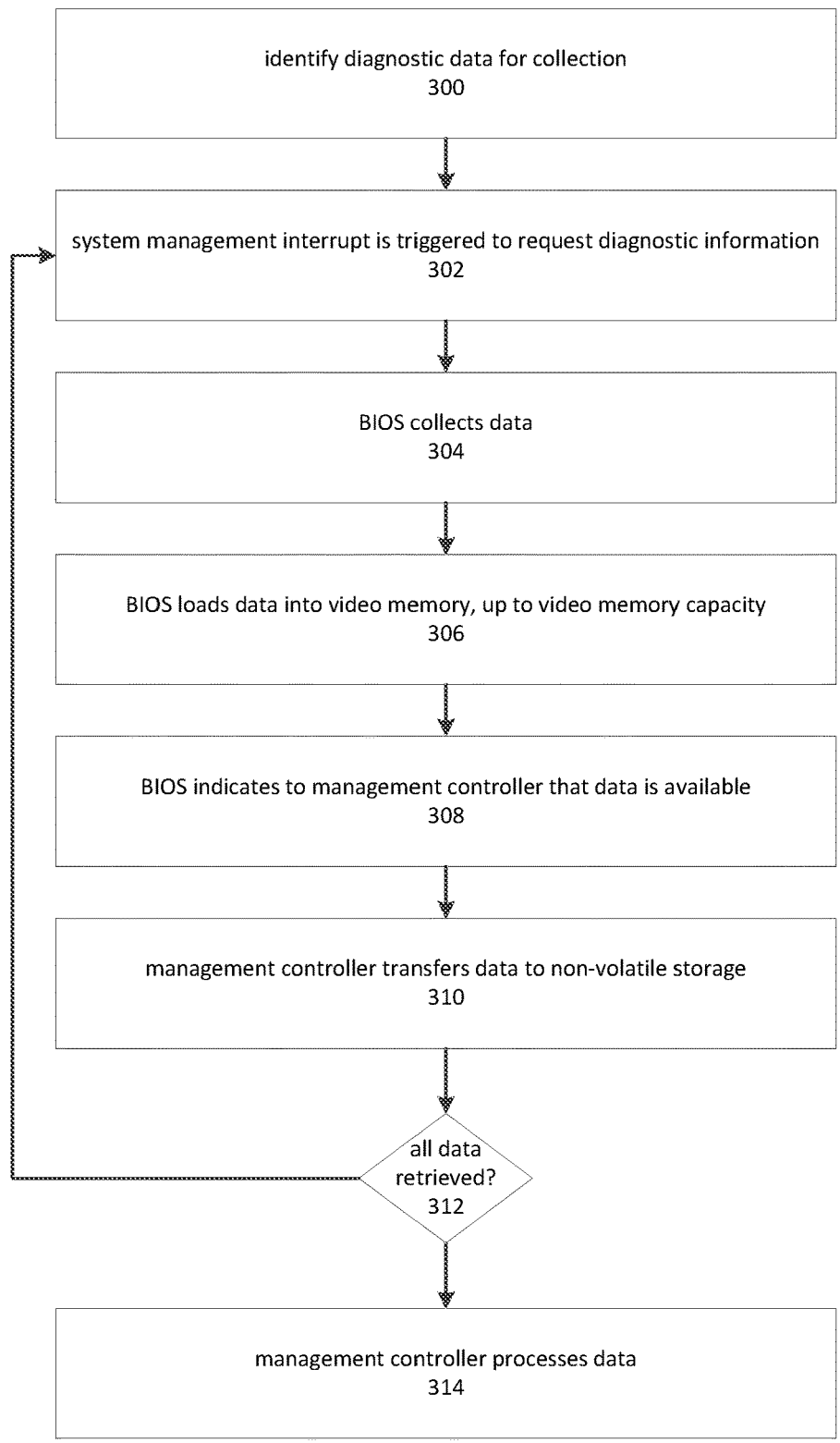
FIG. 3 is a flow diagram depicting a process for collecting diagnostic information.

The BIOS 206 may exchange information with the management controller 100 using aspects of the systems and procedures described herein. For example, FIG. 3 is a flow diagram depicting a process for collecting diagnostic information. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 300 of FIG. 3 depicts identifying diagnostic data for collection. As explained herein, diagnostic data may be collected by the BIOS 206 and transferred to the management controller through a series of requests for diagnostic information. The requests may each identify a particular piece of information to be retrieved, such that at the end of processing a series of such requests, a desired set of information has been obtained. The operations of block 300 may thus pertain to defining the set of diagnostic information that is to be obtained and to communicating the definition to the management controller 100.

Block 302 depicts that a system management interrupt may be triggered on the host computing device, in order to signal that the retrieval of diagnostic information is required. In some instances, the interrupt may be triggered by the host computing system in response to the detection of a fault. In other instances, the management controller 100 may trigger the interrupt. A system management interrupt may refer to a scheduling or attention mechanism in which handler instructions may execute. The handler instructions may be given access to management and diagnostic functions, such as those related to power management, system shutdown, thermal events, safety functions, and so forth. The handler instructions may sometimes be referred to as an interrupt handler or a callback function.

The management controller 100 may trigger the systems management interrupt through a number of means. The interrupt may be triggered via hardware-based signals, such as hardware component pins that result in the interrupt being triggered. In other cases, memory writes to specific locations in memory or to hardware I/O ports may also trigger interrupts. Generally speaking, the processor 110 of the management controller 100 may trigger a systems management interrupt by using one or more of these ways of triggering an interrupt on the computing device.

The management controller 100 may also pass various parameters via the systems management interrupt. For example, the management controller 100 may place data on an execution stack or in an agreed memory location, and then invoke the interrupt. The parameters may be those that define the diagnostic information that is requested.

The BIOS 206 of the computing device 200 may comprise the interrupt handler code. As depicted by block 304, the BIOS 206 may collect the diagnostic data in response to the interrupt, handler being invoked. Alternatively, or in addition, the BIOS 206 may obtain diagnostic data independently of the interrupt, but proceed to provide the information to the management controller 100 upon the interrupt handler being invoked.

As depicted by block 306, the interrupt handler of the BIOS may cause the requested diagnostic information to be loaded into the video memory 114 of the management controller 100. The BIOS 206 may, for example, invoke a DMA transfer of the diagnostic data, or may copy the data through the action of the CPU 208 of the host computing device 200.

The amount of video memory 114 that is available may be less than what is required to receive all of the requested diagnostic information. When that is the case, the interrupt handler may load data up to the amount of available space in the video memory 114. The management controller 100 may request that the additional data be provided by triggering subsequent interrupts, as explained below.

Block 308 depicts that the BIOS 206 may then indicate to the management controller 100 that data is available for retrieval from the video memory 114. The BIOS 206, or more precisely instructions of the BIOS 206 executed by the CPU 208, may notify the management controller 100 that the data is available through signals sent via a management bus 102 of the management controller 100, via an interrupt triggered by writing to a designated location of video memory 114, or other similar approaches.

As depicted by block 310, the management controller 100 may transfer the diagnostic information from the video memory 114 to non-volatile storage 108. Alternatively, the management controller 100 may transfer the diagnostic information from the video memory 114 to a memory other than the video memory 114, or send the data, or a portion thereof, to a client device 220.

After transferring or otherwise processing the diagnostic information, the management controller may cause the data in the video memory 114 to be deleted or overwritten. In some cases, the memory may be overwritten by the subsequent retrieval of additional diagnostic information that is stored in a manner that overwrites previously written information.

Block 312 depicts that the management controller may determine whether a complete set of diagnostic information has been retrieved. In some cases, a requested piece of diagnostic information may be too large to fit into the video memory 114. If so, the BIOS 206 may write a first portion of the diagnostic information to the video memory 114, notify the management controller 100, write a second portion of the diagnostic information to the video memory 114, notify the management controller 100, and so on until all of the data for the requested piece of information has been provided to the management controller.

It may also be the case that, although a requested piece of diagnostic information has been successfully received by the management controller, there remain additional pieces of diagnostic information that have not yet been requested or received. For example, the management controller may have requested and received all portions of a requested memory dump, provided via a series of management interrupts, but have yet to receive or request a system event log. In this example, the pieces of diagnostic information may be described as units of diagnostic information. A number of these units may be combined to define a desired set of diagnostic information. The management controller may receive and maintain a listing indicative of the set of diagnostic data that is to be retrieved in the event of system failure, and issue requests for each item in the set via a series of management interrupts.

Block 314 shows that the management controller may process the received data. The operations of block 314 may, in some instances, be performed in parallel to other operations. A requested piece of diagnostic information might, for example, be processed at the same time as another piece of diagnostic information is being written to the video memory.

The processing of the diagnostic information may comprise storing the diagnostic information in a persistent memory, such as the non-volatile storage 108 depicted in FIG. 1. The processing may also comprise transmitting the data from the non-volatile storage 108 to a client device.

Figure 4:
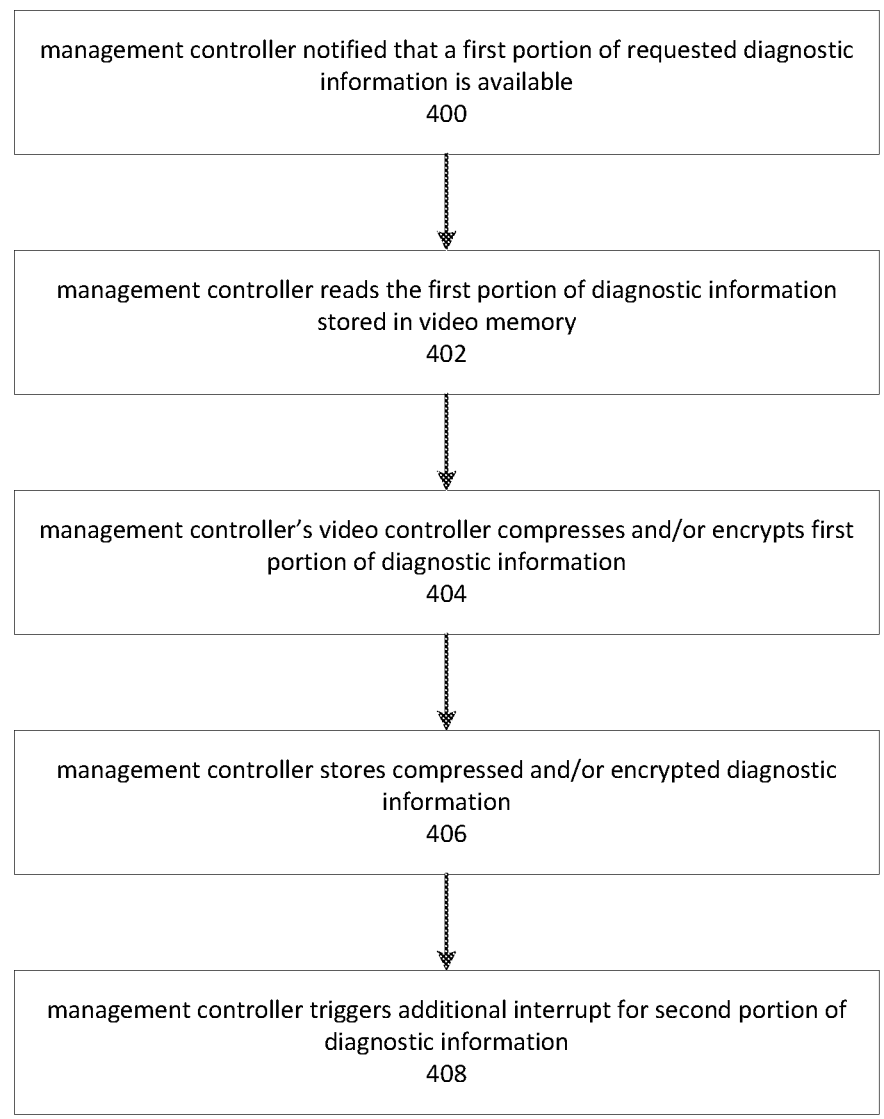
FIG. 4 is a flow diagram depicting operation of a management controller.

The operation of the management controller in transferring diagnostic information may be further understood in view of FIG. 4, which is a flow diagram depicting operation of a management controller. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

As depicted by block 400, a management controller 100 may be notified that a first portion of requested diagnostic information is available. The management controller 100 may, for example, have triggered a management interrupt call that has been handled by the BIOS 206 of the computing device. The BIOS 206 may have collected the requested information, placed it in the video memory, and notified the management controller 100. Then, as depicted by block 402, the management controller 100 may read the first portion of diagnostic information that has been stored in the video memory. Processing the data may comprise various steps, including moving the data to a second memory other than the video memory. As depicted by block 404, the processing may also comprise compression and/or encryption operations which may be performed by the management controller's graphics processors. A graphics controller, for example, may be included in the management controller and may support the compression and/or encryption of data. The graphics controller may also be able to transfer the data to another location, such as a second memory, using memory transfer techniques such as DMA transfer. Block 406 depicts that the management controller may store the compressed and/or encrypted diagnostic information on a second memory. The transfer may be completed, in some cases, by the graphics controller 110, or in other cases by the processor 100.

Block 408 depicts that the management controller 100 may determine that the first portion of diagnostic information was incomplete. In order to retrieve the remaining portions of the requested piece of diagnostic information, the management controller may issue an additional interrupt indicating that the next portion of the data should be written to the video memory 114. The BIOS 206 may then begin writing the second portion of the diagnostic data to the video memory.

In some cases, diagnostic information may also be provided to the host computing device. This may occur, for example, after the host computing device has recovered from a system failure. When the failure occurred, the management controller may have stored the diagnostic information in non-volatile storage. Upon recovery of the computing device, the management controller may determine that the diagnostic information is available and initiate a sequence of operations for transferring the diagnostic information back to the host computing device.

Figure 5:
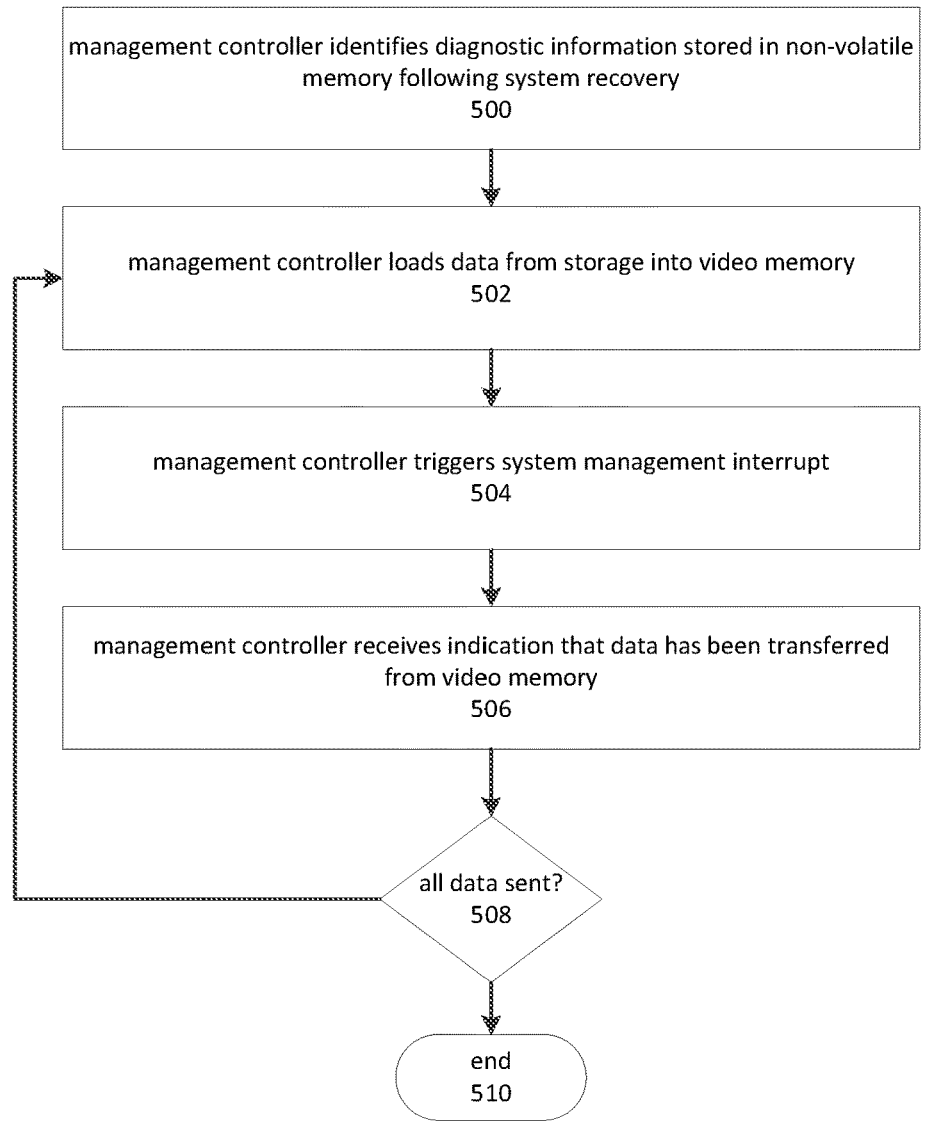
FIG. 5 is a flow diagram depicting operation of a management controller upon system recovery.

FIG. 5 is a flow diagram depicting operation of a management controller upon system recovery. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 500 depicts that the management controller 100 may identify diagnostic information stored in a non-volatile memory 108 addressable by the management controller 100. In some instances, the operations of block 500 may be performed in response to a signal by the BIOS 206 indicating that the host computing device has recovered from a failure. In other instances, the management controller may examine the contents of the non-volatile memory 108 to determine if diagnostic information is available and if so, begin performing operations for transferring the diagnostic information to the host computing device.

Block 502 depicts that the management controller may load a portion of the diagnostic information from the non-volatile storage and load it into the video memory. If the data had been compressed and/or encrypted, it may under some circumstances be decompressed and/or encrypted prior to storing the data in video memory. In some instances, the data may be stored in the video memory in compressed and/or encrypted format, and decrypted using the primary graphics controller 210 of the computing device, rather than using the graphics controller 112 of the management controller.

Block 504 depicts that the management controller may trigger a management interrupt for handling by the BIOS 206. The interrupt may be associated with parameters identifying the diagnostic information. Where units of diagnostic information are provided in portions due to limitations on the amount of available video memory, the interrupt may also include information indicating whether or not there are additional segments available that pertain to the same unit of information.

Block 506 depicts that the BIOS 206 may respond to each interrupt by indicating that the data has been transferred from video memory, so that the management controller may write the next portion of diagnostic information to the video memory.

As depicted by block 508, that the management controller may continue to provide diagnostic information to the host computing device, until either all of the available information has been provided or until the process is interrupted. If no more data needs to be sent, the process may end as depicted by block 510.

Figure 6:
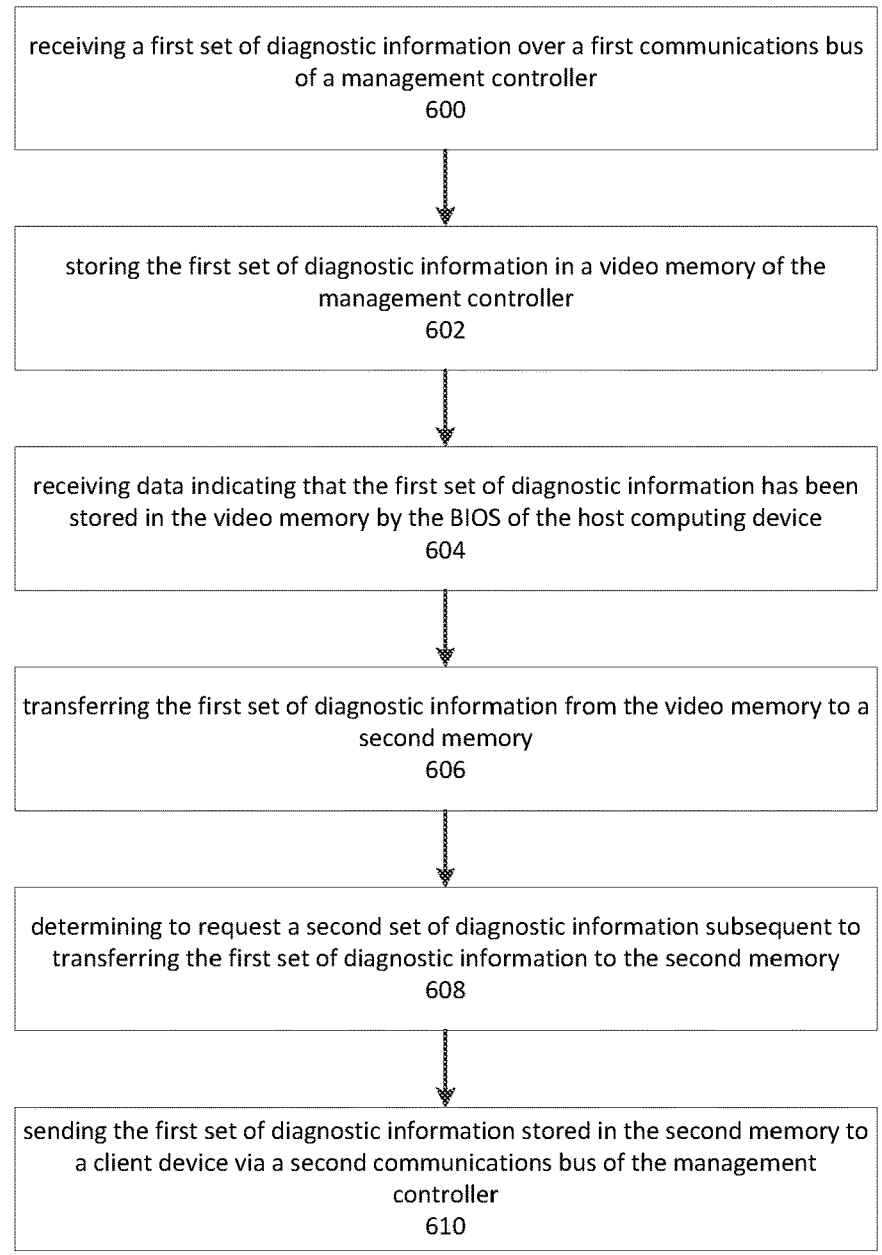
FIG. 6 is a flow diagram depicting operation of a system comprising a management controller.

Additional aspects of the present disclosure may be understood in view of FIG. 6, which is a flow diagram depicting operation of a system comprising a management controller. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 600 depicts receiving a first set of diagnostic information over a first communications bus of a management controller. Various applicable techniques and methods for receiving a first set of diagnostic information have been described herein. In a further example, a management controller may request diagnostic information by triggering a systems management interrupt with one or more parameters that identify the requested information. A BIOS 206 or other firmware may process the interrupt via an interrupt handler. The BIOS 206, or in particular a CPU 208 of the host computing system executing instructions of a BIOS 206, may collect diagnostic information and write the information to the video memory of the management controller. The information may be written to a PCIe bus or other communications channel, and thereby be received by the management controller. In some instances, the data may be written using DMA transfer techniques, by a memory controller, or by the operation of the host computing device's CPU.

Block 602 depicts storing the first set of diagnostic information in a video memory of the management controller. Various applicable techniques for storing the first set of diagnostic information in the video memory have been described herein. For example, the management controller may disable its onboard graphics controller's generation of a video signal when the video memory is to be used to store diagnostic information. Alternatively, the video memory may be partitioned such that a portion of the video memory is used by the management controller's onboard graphics controller for generating a video signal, and the remaining portion used for storing diagnostic information. Diagnostic data received by the management controller may be stored in the reserved space. The diagnostic information may be stored in the video memory of the management controller via the memory transfer techniques described in relation to block 600.

Block 604 depicts receiving data indicating that the first set of diagnostic information has been stored in the video memory by the BIOS 206 of the host computing device. Various applicable techniques have been described herein. As described, a signal or interrupt may be sent or triggered by the BIOS 206, such that the management controller is notified. For example, the signal or interrupt of the BIOS 206 may cause a processor of the management controller to execute instructions for transferring the first set of diagnostic information from the video memory to a second memory.

The management controller may identify the location of the diagnostic information within the video memory based on the selected approach to reserving portions of the video memory for use in transferring diagnostic information. For example, the management controller may identify a portion of the video memory that the graphics controller has reconfigured for use in transferring diagnostic information.

Block 606 depicts transferring the first set of diagnostic information from the video memory to a second memory. Various techniques for transferring the diagnostic information have been described herein. For example, the transfer may be performed by operation of the management controller's processor, by the operation of a memory controller of the management controller, or by the operation of the graphics controller of the management controller. One or more of these components may, for example, initiate of facilitate a DMA memory transfer from the video memory to the second memory. The second memory, as described herein, may comprise a non-volatile storage on which a collection of diagnostic data may be maintained. The management controller may maintain an index or similar structure of the diagnostic information stored in the second memory.

Block 608 depicts determining to request a second set of diagnostic information subsequent to transferring the first set of diagnostic information to the second memory. As described herein, the operations of block 606 may be performed upon receiving indication that the diagnostic information stored in the video memory is no longer needed. The management controller may request additional information when a previous request for a unit of diagnostic information is incomplete. The incompleteness of the provided data may be conveyed by the BIOS 206 to the management controller via a flag or other indicator stored in the video memory in a data structure header or in a predefined memory location. The management controller may also determine that additional units of diagnostic information may be required. The management controller may issue a series of requests for diagnostic information, via the operations depicted by block 600, based on a list or map indicating which units of data are to be requested. As the units of diagnostic information are obtained via the video memory and stored in the second memory, the management controller may store information in the second memory to indicate that the data has been retrieved.

In some instances, a predefined or standardized definition of diagnostic information may be understood and supported by both the management controller and the BIOS 206. For example, various forms of diagnostic information may be assigned unique identifiers, such that the management controller may trigger an interrupt requesting that the BIOS 206 provide diagnostic information, in which parameters associated with the interrupt include identifiers of the requested diagnostic information.

Block 610 depicts sending the first set of diagnostic information stored in the second memory to a client device via a second communications bus of the management controller. The second communications bus may be a relatively low-speed bus used, for example, to enable communication between the management controller and a client device. Transfer of data from the second memory of the management controller to the client device may be performed in-bulk, i.e. for all diagnostic information, or for specific, identified units or sub-units of diagnostic information. The management controller's processor may, for example, process a request to provide a unit of diagnostic information to the client, determine that the requested unit of information has been stored on the second memory, and transmit the data over the second communications bus. The second communications bus may, for example, correspond to a communications channel implemented over an SMBus, I2C, LPC, or serial communications bus.

In some instances, the operation of a system comprising a management controller may include performing at least one of compression or encryption on diagnostic information that has been placed into video memory, prior to storing the diagnostic information in the second memory. Various techniques for performing the compression and encryption are explained herein. For example, the video controller of the management controller may be instructed, by the operation of the management controller's processor, to initiate compression and or encryption algorithms on the diagnostic information stored in the video memory, and to then transfer the compressed and/or encrypted data to the second memory.

In some instances, the operation of a system comprising a management controller may include transferring diagnostic information from the second memory to the video memory, for reading by the BIOS 206, upon recovery from system failure. FIG. 5 provides an example of transferring diagnostic information from the second memory to the video memory upon recovering from a system failure.

Figure 7:
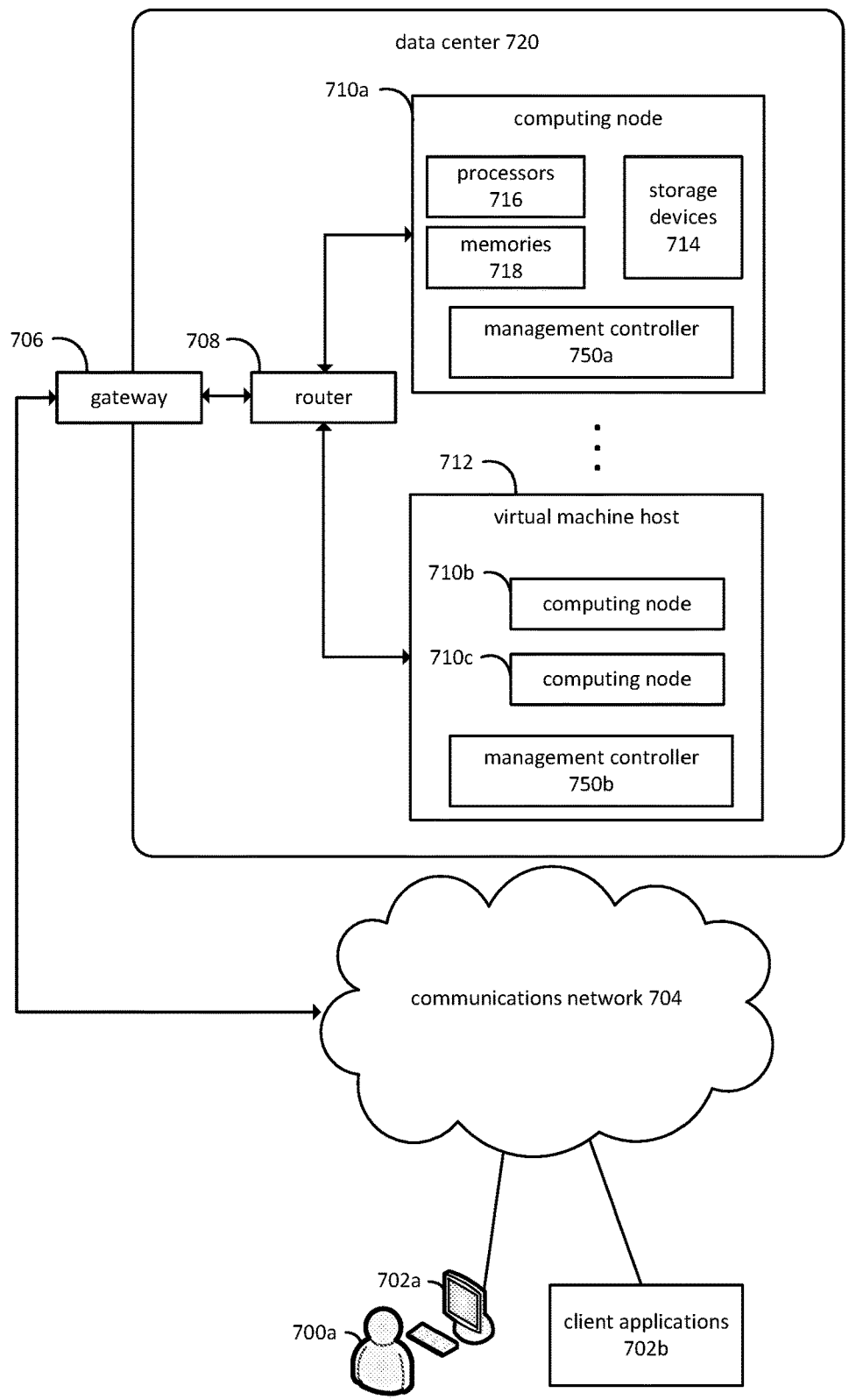
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

In some cases, the client applications 702b or the computing device 702a may comprise administrative clients that may interface with the management controllers 750a, 750b. The administrative clients may, for example, receive diagnostic information transferred from the computing nodes 710a-710c and the virtual machine host 712.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718, or storage devices 714. The physical computing node 710a may have a management controller 750a. The management controller 750a may, for example, be embedded in the motherboard of the physical computing node 710a.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The virtual computing nodes 710b and 710c may comprise virtualized management controllers (not shown), but there may also be a non-virtual management controller 750b embedded in the virtual machine host 712. The virtual machine host, similar to the physical computing node 710a, may have the management controller 750b embedded on its motherboard.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
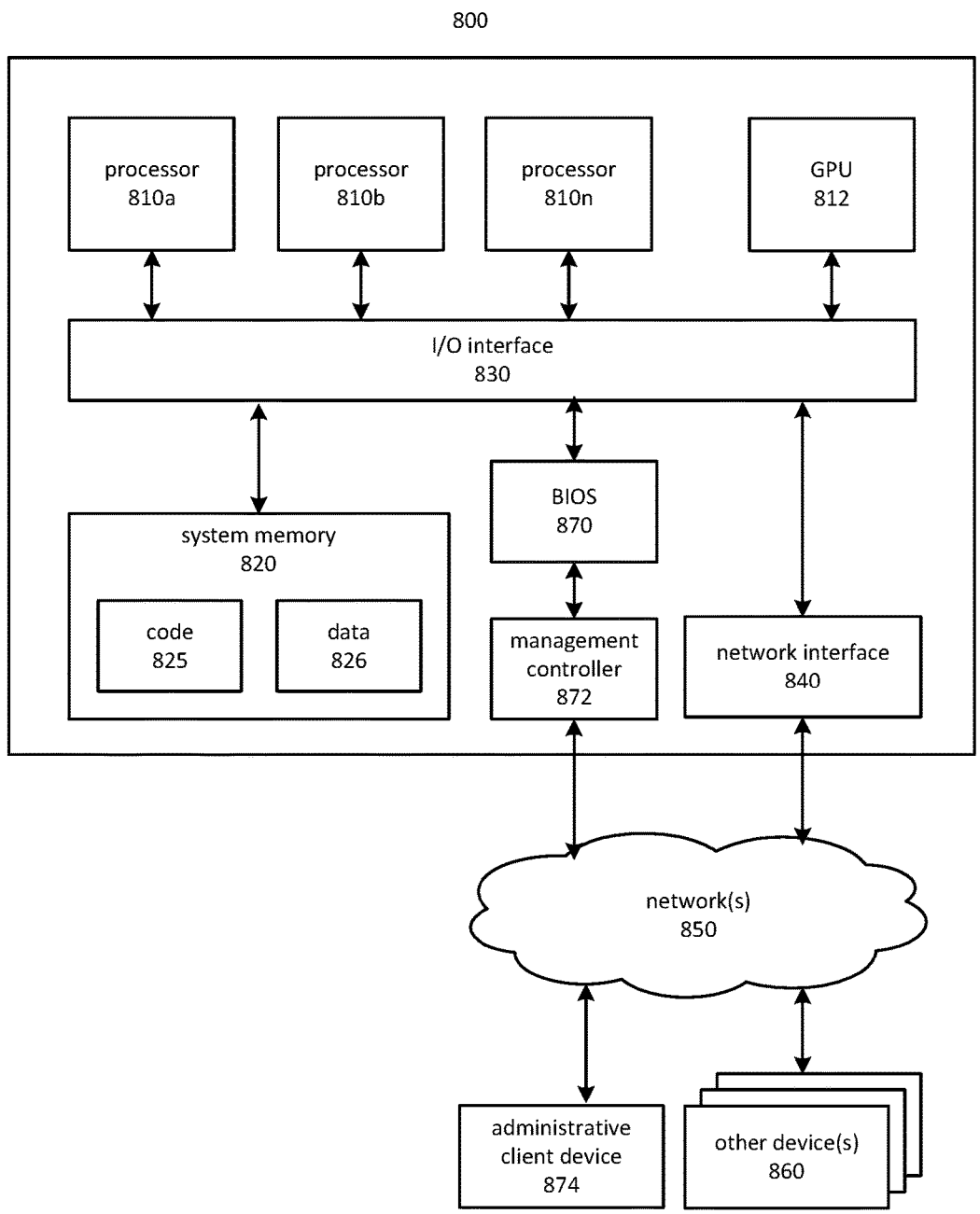
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 800 may further comprise a BIOS 870 and a management controller 872. The BIOS 870 may comprise instructions loaded into system memory 820, or into a firmware memory (not shown). The BIOS 870 may interact with the management controller 872, as described herein, to provide diagnostic information. The management controller 872 may provide the diagnostic information, as described herein, to an administrative client device 874 via network(s) 850.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a first one or more processors;
   a graphics controller;
   a video memory addressable by the graphics controller and by the first one or more processors, the memory further connected to a second one or more processors of a computing device via a first communications bus;
   a non-volatile memory, the non-volatile memory addressable by the first one or more processors;
   one or more memories having stored thereon executable instructions that, upon execution by the first one or more processors, cause the system at least to:
   send data indicative of a request to receive a first diagnostic information from a basic input/output system of the computing device;
   receive data indicating that at least a subset of the first diagnostic information has been loaded into the video memory by the execution of basic input/output system instructions by the second one or more processors;
   cause the graphics controller to transfer the first diagnostic information from the video memory to the non-volatile memory; and
   send the data indicative of the first diagnostic information stored in the volatile memory over a second communications bus.

2. The system of claim 1, wherein the one or more memories have stored thereon further executable instructions which, upon execution by the first one or more processors, cause the system at least to:
   trigger a first interrupt comprising the request to receive the first diagnostic information; and
   trigger a second interrupt comprising a second request for a second diagnostic information.

3. The system of claim 1, wherein the one or more memories have stored thereon further executable instructions which, upon execution by the first one or more processors, cause the system at least to:
   determine that a second subset of the first diagnostic information has not been loaded into the video memory; and
   send data indicative of a request to receive the second subset of the first diagnostic information.

4. The system of claim 1, wherein the one or more memories have stored thereon further executable instructions which, upon execution by the first one or more processors, cause the system at least to:
   cause the graphics controller to compress the at least a subset of the first diagnostic information prior to transferring the compressed at least a subset of the first diagnostic information to the non-volatile memory.

5. The system of claim 1, wherein the one or more memories have stored thereon further executable instructions which, upon execution by the first one or more processors, cause the system at least to:
   determine, in response to data indicating that the computing device has recovered from a system failure, that the at least a subset of the first diagnostic information has been stored in the non-volatile memory;
   load the at least a subset of the first diagnostic information into the video memory; and
   send information indicating that the at least a subset of the first diagnostic information is available to be read from the video memory by the second one or more processors of the computing device.

6. A method of obtaining diagnostic information from a computing device, the method comprising:
   triggering an interrupt of one or more processors of the computing device and providing, by the interrupt, information indicative of a request for a first diagnostic information;
   receiving data indicating that at least a subset of the first diagnostic information has been stored in a first memory of the management controller, wherein the at least a subset of the first diagnostic information was received by a first communications bus;

causing the management controller to transfer the first diagnostic information from the first memory to a second memory of the management controller; and sending data indicative of the first diagnostic information stored in the second memory over a second communications bus.

7. The method of claim 6, further comprising:
triggering a second interrupt in response to determining that the first diagnostic information comprises a second subset of the first diagnostic information in addition to the at least a subset of the first diagnostic information.

8. The method of claim 6, further comprising:
receiving, at the management controller, information indicative of a plurality of diagnostic information available from the computing device, the plurality of diagnostic information comprising the first diagnostic information; and
triggering the interrupt based on the information indicative of the plurality of diagnostic information.

9. The method of claim 6, further comprising:
causing a graphics controller of the management controller to compress the at least a subset of the first diagnostic information.

10. The method of claim 6, wherein the interrupt is processed by a management interrupt handler of an input/output system of the computing device.

11. The method of claim 6, further comprising:
disabling a first frame buffer of a plurality of frame buffers used by a graphics controller of the management controller, each of the plurality of frame buffers corresponding to a non-overlapping region of the first memory; and
providing an address of the first frame buffer in the first memory in the information indicative of the request for the first diagnostic information.

12. The method of claim 6, further comprising:
receiving, at the management controller, information indicating that the computing device has recovered from a system failure;
loading the at least a subset of the first diagnostic information into the first memory from the second memory;
triggering a second interrupt indicating that the at least a subset of the first diagnostic information has been loaded into the first memory; and
receiving, at the management controller, information indicating that the at least a subset of the first diagnostic information may be overwritten in the first memory.

13. The method of claim 6, wherein a basic input/output system causes the at least a subset of the first diagnostic information to be written to the first memory and the basic input/output system sends, to the management controller, the data indicating that at the least a subset of the first diagnostic information has been stored in a video memory.

14. The method of claim 6, wherein the second communication bus has a lower maximum bandwidth than the first communication bus.

15. The method of claim 6, further comprising:
causing a graphics controller of the management controller to encrypt the at least a subset of the first diagnostic information prior to transferring the encrypted at least a subset of the first diagnostic information to the second memory.

16. A system comprising:
means for receiving a first set of diagnostic information over a first communications bus of a management controller and storing the first set of diagnostic information in a video memory of the management controller;
means for receiving data indicating that the first set of diagnostic information has been stored in the video memory;
means for transferring the first set of diagnostic information from the video memory to a second memory;
means for determining to request a second set of diagnostic information subsequent to the transferring of the first set of diagnostic information from the video memory; and
means for sending the first set of diagnostic information stored in the second memory to a client device via a second communications bus.

17. The system of claim 16, wherein the video memory is addressable by a first processor of the management controller and a second processor of a computing device external to the management controller.

18. The system of claim 16, wherein a host computing device causes the first set of diagnostic information to be written to video memory and sends the data indicating that the first set of diagnostic information has been stored in the video memory.

19. The system of claim 16, further comprising:
means for performing at least one of compressing or encrypting the first set of diagnostic information prior to storing the first set of diagnostic information on the second memory.

20. The system of claim 16, further comprising:
means for transferring the first set of diagnostic information from the second memory to the video memory upon recovery from system failure.

* * * * *